(12) United States Patent
Ronsen

(10) Patent No.: US 12,090,960 B2
(45) Date of Patent: Sep. 17, 2024

(54) PORTABLE PLATFORM WITH RETRACTABLE STAIRCASE

(71) Applicant: David Ronsen, Bozeman, MT (US)

(72) Inventor: David Ronsen, Bozeman, MT (US)

(*) Notice: Subject to any disclaimer, the term of this patent is extended or adjusted under 35 U.S.C. 154(b) by 289 days.

(21) Appl. No.: 17/895,487

(22) Filed: Aug. 25, 2022

(65) Prior Publication Data

US 2024/0067095 A1    Feb. 29, 2024

(51) Int. Cl.
  *B62D 33/02*  (2006.01)
  *B60R 3/02*  (2006.01)
  *B62D 47/00*  (2006.01)
  *B60R 16/023*  (2006.01)
  *B60R 16/03*  (2006.01)

(52) U.S. Cl.
  CPC ............... B60R 3/02 (2013.01); B62D 33/02 (2013.01); B62D 47/00 (2013.01); *B60R 16/0238* (2013.01); *B60R 16/03* (2013.01)

(58) Field of Classification Search
  CPC .. B62D 33/02; B62D 33/027; B62D 33/0222; B60R 3/02
  USPC ................. 296/181.3, 183.1, 182.1
  See application file for complete search history.

(56) References Cited

U.S. PATENT DOCUMENTS

| | | | |
|---|---|---|---|
| D132,712 S * | 6/1942 | Troche et al. | 296/24.32 |
| 2,358,446 A * | 9/1944 | Couse | B60P 3/14 135/88.13 |
| 2,365,940 A * | 12/1944 | Couse | B60P 3/14 296/24.32 |
| 3,462,170 A | 8/1969 | Smith et al. | |
| 3,698,511 A | 10/1972 | Dohan | |
| 5,687,813 A | 11/1997 | Bensch | |
| 5,941,342 A | 8/1999 | Lee | |
| 6,810,995 B2 | 11/2004 | Warford | |
| 7,438,304 B2 | 10/2008 | Segall | |
| 7,658,266 B1 | 2/2010 | Clement | |
| 10,549,697 B2 | 2/2020 | Rolson | |
| 2005/0211502 A1 | 9/2005 | LaBrash | |
| 2006/0290092 A1 | 12/2006 | Segall | |
| 2019/0291648 A1 | 9/2019 | Rolson | |
| 2020/0269211 A1 | 8/2020 | Serre et al. | |

* cited by examiner

*Primary Examiner* — Dennis H Pedder
(74) *Attorney, Agent, or Firm* — Antoinette M. Tease

(57) ABSTRACT

A portable platform with a retractable staircase, the portable platform having a platform frame. The frame is rectangular in shape and made up of four corner posts, front and rear panels, two midrails, and two top rails. The staircase pivots about a single pivot point situated at floor level on the platform, which also comprises a landing. The platform has two pivotable gates, one of which is situated at the front of the platform frame and the other of which is situated at the top of the staircase. An extension plate extends rearwardly from the rear panel of the platform at floor level and is configured to overlie a truck bed. Anchor legs extend downwardly from the extension plate and are configured to fit within existing apertures in the truck bed. The staircase is raised and lowered with a brake winch.

16 Claims, 14 Drawing Sheets

PORTABLE PLATFORM WITH RETRACTABLE STAIRCASE

BACKGROUND OF THE INVENTION

1. Field of the Invention

The present invention relates generally to the field of automotive vehicle accessories, and more specifically, to a portable platform with a retractable staircase that is configured for installation on a specific type of military vehicle referred to as an "FMTV" or Family of Medium Tactical Vehicles.

2. Description of the Related Art

The present invention is designed for National Guard units to facilitate the loading and unloading of civilians into and out of an FMTV truck. The truck bed is approximately sixty-three (63) inches off of the ground, which makes it difficult for most civilians to access the vehicle. The National Guard has been called upon increasingly frequently to deal with domestic responses such as flood rescue and wildland firefighting.

As such, there is a need for an accessory or attachment to an FMTV that will make accessing the truck safer and faster for civilians. The present invention is a portable platform with a retractable staircase that couples to the back of the cargo bed of the truck via anchor legs that are inserted into existing slots in the bed. It is a self-contained system with no modifications to the vehicle required. Although there is limited prior art for various staircase-related inventions, none of them embodies the specific structural features of the present invention, the details of which are discussed more fully below.

U.S. Pat. No. 3,462,170 (Smith et al., 1969) discloses a collapsible step construction for a camper. The invention comprises a pair of opposite side frames including elongated upstanding riser members and elongated horizontal tread members. The riser members of the frames are crossed and pivotally secured together intermediate their opposite ends, and the upper ends of the riser members are pivotally secured to the adjacent rear ends of the tread members disposed immediately thereabove. The lower ends of the riser members are pivotally secured to the adjacent forward ends of the tread members immediately therebelow.

U.S. Pat. No. 3,698,511 (Dohan, 1972) provides a modular fixed-level work platform comprised of a plurality of identical platform and ladder modules. The modules are releasably connected together in various combinations to achieve a unitary rigid structure that establishes a fixed level work platform supported by steps providing access thereto. Each ladder module comprises a pair of separate overlying identical parallelogram ladder frames, each of which has a pair of identical parallel inclined members attached to the free ends of a pair of identical parallel, vertical members. Each vertical member has a pair of spaced holes that allow one module to be rigidly attached to an adjacent module with bolts.

U.S. Pat. No. 5,687,813 (Bensch, 1997) discloses a vehicle boarding device in the form of a detachable ladder for use with military vehicles. The ladder has an adjustable mounting apparatus, which allows it to be attached to a variety of vehicle tailgates. The invention comprises a first section with a pair of handrails, a plurality of connecting spoke members attached to the side rails to hold them in a spaced parallel configuration a C-shaped bracket member on one end of each side rail, and an adjustable bracket mounted on each side rail and moveable longitudinally along the side rail. The adjustable brackets cooperate with the C-shaped brackets to facilitate gripping that part of the vehicle to which the invention is attached.

U.S. Pat. No. 5,941,342 (Lee, 1999) provides a folding staircase comprising a plurality of step units, each of which has a pair of horizontal link bars, a pair of vertical link bars that are pivotally connected to the horizontal link bars, and a plate situated between the horizontal link bars. The invention further comprises a fixing unit for securing the staircase to a vehicle, the fixing unit comprising a pair of support members, a pair of guide members, an upper bar installed between the guide members, and a hook fixed to the upper bar. Each of the guide members is pivotally and slidably connected to a slot in the support member.

U.S. Pat. No. 6,810,995 (Warlord, 2004) discloses an adjustable stair and platform system including a set of stairs that is affixable to a platform at a first or second height. The stairs have a stair rail frame that is releasably affixable to the side hand rail frame of the platform. An end rail frame is pivotally mounted to the side hand rail frame and changeable to support a right-hand or left-hand configuration of the side hand rail frame. The invention is designed to be used with portable buildings.

U.S. Pat. No. 7,438,304 (Segall, 2008) provides a mount/discount system for use with a vehicle that has a flat bed. The invention comprises a tubular frame and attachments for securing the frame to the vehicle. The tubular frame has a grip pole that extends perpendicularly from the vehicle bed. The tubular frame also includes a crossbar that interconnects and is coplanar with the grip pole and a support pole. The support pole incorporates a step for concerted use with the grip pole and the support pole by personnel as they mount and dismount the vehicle.

U.S. Pat. No. 7,658,266 (Clement, 2010) discloses a staircase device adapted to fit to a truck bed. The staircase incorporates a mechanism for facilitating the loading and unloading of items onto and off of the truck bed. The staircase comprises a first lower platform having a hitch connector for connecting to a vehicle and a second platform that is parallel to the first platform. A staircase structure connects the first and second platforms. The invention further comprises an extension section that is connected to the second platform.

U.S. Pat. No. 1,054,967 (Rolson, 2020) provides a portable ladder system that is pivotally mounted to a ladder support member, which is removably secured to the edge of a truck trailer bed. A pivoting ladder section having a plurality of steps affixed between a pair of side ladder members is pivotally attached to the ladder support member. A securing system secures the ladder support member to an aperture along the edge of the truck bed and comprises a bed engaging projection and a locking assembly. The locking assembly comprises a locking boss housed in the bed engaging projection, an actuating arm connected to the locking boss, and an actuating arm lock that locks the actuating arm when it has moved the locking boss to an extended position.

U.S. Patent Application Pub. No. 2005/0211502 (LaBrash) describes a ladder assembly that is specifically configured to be attached to an upright tailgate of a vehicle so as to facilitate the ingress and egress of personnel while the tailgate is in an upright position. The ladder assembly comprises an attachment portion with a pair of clamps that enable the ladder assembly to be attached to tailgates of differing thicknesses. The ladder assembly further comprises a ladder portion that is configured to be folded and selectively inclined.

U.S. Patent Application Pub. No. 202010369211 (Kay et al., 2020) describes a detachable and retractable stair system for vehicles. Mounting brackets are provided at opposing sides of a floor plate. A one-piece mounting bracket assembly is provided for installation at the threshold of a door of a recreational vehicle. The stair assembly pivots about pivot studs on the mounting brackets. A sill cover plate is shaped and sized to fit over the threshold and sill in a recreational vehicle doorway while still allowing closure of the door.

It is an object of the present invention to provide a lower entry-level height for an FMTV vehicle. It is another object of the present invention to improve significantly the safety and speed of ingress and egress into and out of the vehicle for civilians and troops. It is another object of the present invention to provide a platform with an integrated staircase that is compatible with all A0, A1, A1R, A1P2 and A2 LMTV/MTV cargo variants (M1078. M1081, M1083, M1085 and M1093) without any modifications required to the vehicle. It is another object of the invention to provide a portable platform/staircase that can be installed in minutes with a standard armory/depot forklift for quick deployment. It is yet another object of the invention to provide a solution that can be powered by the existing vehicle trailer connector.

BRIEF SUMMARY OF THE INVENTION

The present invention is a portable platform comprising: a platform frame that defines a rectangular space, the platform frame comprising: four corner posts, the first corner post being situated in a first front corner of the platform frame, the second corner post being situated in a second front corner of the platform frame, the third corner post being situated in a first rear corner of the platform frame on a same side of the platform frame as the first corner post, and the fourth corner post being situated in a second rear corner of the platform frame on a same side of the platform frame as the second corner post; a front panel situated along a front bottom side of the platform frame between the first and second corner posts; a rear panel situated along a rear bottom side of the platform frame between the third and fourth corner posts; a first upright member situated in between the first and second corner posts in a vertical orientation; and a second upright member situated in between the third and fourth corner posts in a vertical orientation. The invention further comprises a landing situated across a portion of a bottom of the platform frame in a space defined by the second corner post, the fourth corner post, the first upright member, and the second upright member; a retractable staircase that pivots about a pivot point that extends from the front panel to the rear panel of the platform frame, the staircase comprising two parallel side members with a plurality of stair steps disposed between them; a first pivotable gate situated on a front part of the platform frame above the landing and configured to swing inwardly; a second pivotable gate situated in between the first and second upright members above a top end of the retractable staircase and configured to swing inwardly over the landing; a first midrail that extends from the first corner post to the first upright member; a second midrail that extends from the third corner post to the second upright member and is parallel to the first midrail, thereby defining a gap between the fourth corner post and the second upright member; an extension plate that extends forwardly from a rear edge of the platform and is configured to overlie a rear edge of a truck bed; and first and second anchor legs that extend downwardly from the extension plate and are configured to fit within existing apertures in the truck bed.

In a preferred embodiment, the extension plate is situated at a top edge of the rear panel and at a same level as the landing. The invention preferably further comprises a plurality of vertically oriented bumpers that are situated on a front surface of the rear panel and configured to abut up against a rear end of the truck when the portable platform is installed on the truck. The bumpers are preferably comprised of high-density polyethylene.

In a preferred embodiment, each anchor leg has a width and a depth at a top end of the anchor leg and a width and a depth at a bottom end of the anchor leg, and the width and the depth of the anchor leg at the bottom end of the anchor leg are less than the width and the depth of the anchor leg at the top end of the anchor leg. The bottom end of each anchor leg preferably comprises an internal pin that is configured to receive a hook.

In a preferred embodiment, the invention further comprises a seat that is situated on top of the extension plate and that extends forwardly from the second midrail. In another preferred embodiment, the invention further comprises a brake winch that is configured to raise and lower the retractable staircase about the pivot point. The retractable staircase preferably further comprises a first handrail and a second handrail, wherein the first handrail is fixedly attached to the first side member, and wherein the second handrail is fixedly attached to the second side member. In an alternate embodiment, the retractable staircase further comprises a first handrail and a second handrail, wherein the first handrail is removably attached to the first side member, and wherein the second handrail is removably attached to the second side member.

In a preferred embodiment, the invention further comprises a first surface-mount ratchet and a second surface-mount ratchet, each of the first surface-mount ratchet and the second surface-mount ratchet being configured to secure the portable platform to the truck via a hook that is secured to the pin in the anchor leg. Preferably, the invention further comprising a power cable that is connected to an electrical junction box on the portable platform and configured to be plugged into an existing power supply port on the truck.

In a preferred embodiment, the invention further comprises: a first support member that is connected to and extends between the front panel and the rear panel underneath the front and rear upright members; a second support member that is connected to and extends between the front panel and the rear panel and is situated underneath the landing; and a first staircase stop and a second staircase stop, each of which has a proximal end that is fixedly attached to the first support member and a distal end that is configured to abut up against a top part of one of the two side members of the retractable staircase when the staircase is in a fully extended position, the distal end of each staircase stop being at an angle that is equal to a desired angle of the staircase when it is fully extended. The distal end of each of the first and second staircase stops preferably comprises a high-density polyethylene pad.

Optionally, the landing comprises two apertures that are configured to receive mounting brackets of a military cargo bed ladder, the two apertures being situated directly underneath the first pivotable gate. In a preferred embodiment, the platform frame further comprises a front top rail that extends from the first corner post to the first upright member at a top of the platform frame and a rear top rail that extends from the third corner post to the second upright member at the top of the platform frame; wherein a pair of forklift tine pockets is situated on top of the front top rail; and wherein a pair of forklift tine pockets is situated on top of the rear top rail.

REFERENCE NUMBERS

Figure 1:
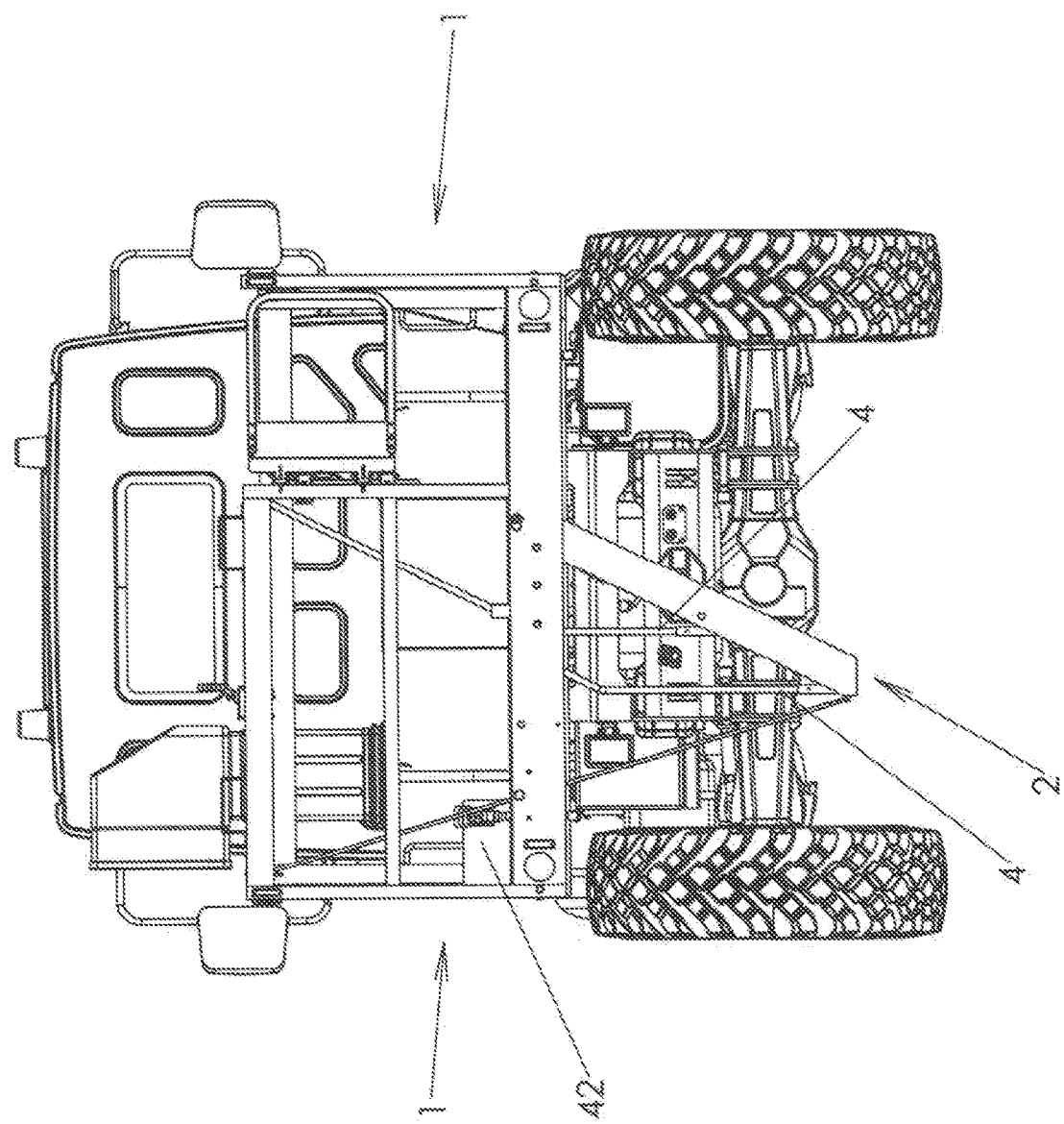
FIG. 1 is a rear view of the present invention shown installed on an FMTV truck with the staircase in a fully extended position.

1 Platform
2 Staircase
3 Floor for platform)
4 Handrail (of staircase)
4a First vertical post
4b Second vertical post
4c Connecting member
5 Side member (of staircase)
6 Front midrail (of platform frame)
7 Platform frame
8 Pivotable gate
9 Extension plate
10 Winch
11 Rear top rail (of platform frame)
12 Pulley
13 Pivot point
14 Cable
15 Anchor leg
16 Rear panel
17 Bumper
18 Forklift tine pocket
19 Front top rail (of platform frame)
20 Front panel
21 Corner post
22a Front upright member
22b Rear upright member
23a First connecting rail
23b Second connecting rail
23c Third connecting rail
23d Fourth connecting rail
24 Rear midrail
25 First surface-mount ratchet
26 Power cable
27 Port (for power cable)
28 Stair step
29 Staircase stop
30 Shaft
30a Head (of shaft)
31 Pin
32 Handrail (of platform)
33 Seat
34 Side plate
35 First support member
36 Second support member
37 High-density polyethylene pad
38 Strap (of first surface-mount ratchet)
39 Hook (of first surface-mount ratchet)
40 Pin (in anchor leg)
41 Second surface-mount ratchet
42 Bracket
43 Strap (of second surface-mount ratchet)
44 Hook (of second surface-mount ratchet)
45 Aperture (in floor)
46 Military ladder
47 Bracket

DETAILED DESCRIPTION OF INVENTION

Figure 7:
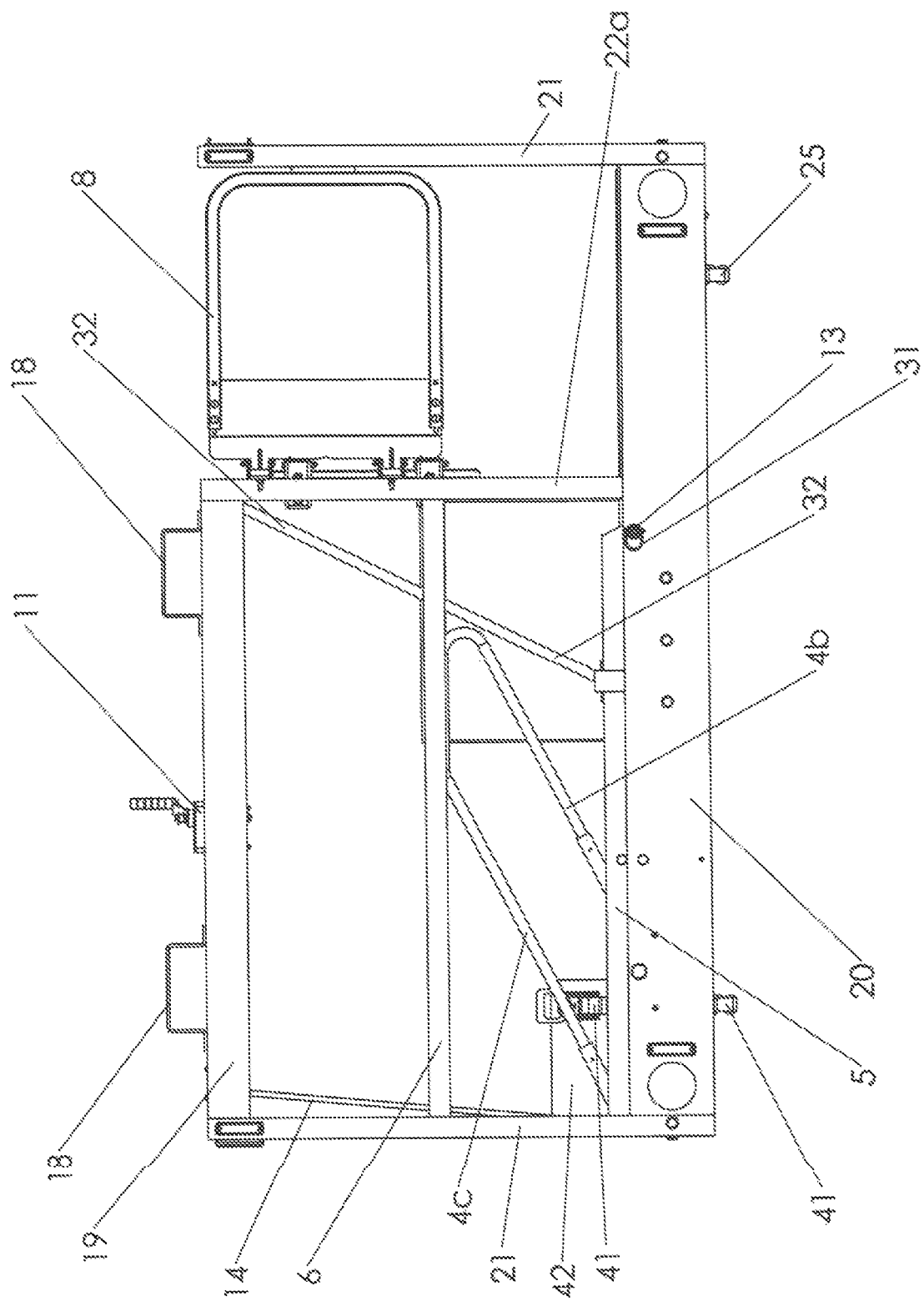
FIG. 7 is a rear view of the present invention shown with the staircase in a fully retracted position.

FIG. 1 is a rear view of the present invention shown installed on an FMTV truck. As shown in this figure, the present invention comprises a stationary platform 1 and a retractable staircase 2. The retractable staircase 2 is configured so that it extends downwardly from the platform floor (also referred to as the "landing") 3 (see FIG. 2). When fully extended, as shown in FIG. 1, the staircase is oriented so that it faces the left side of the vehicle. The staircase comprises two sets of handrails 4, which may be removable or may be affixed to the side members 5 of the staircase (see FIG. 3). Each handrail 4 preferably comprises a first vertical post 4a, a second vertical post 4b, and a connecting member 4c that connects the first and second vertical posts at the top of each post (see also FIG. 5). The connecting member 4c is preferably parallel with the side member 5. The connecting member 4c is preferably configured so that when the staircase is fully retracted, as shown in FIG. 7, the connecting member 4 is parallel with the front midrail and the rear midrail 6, 24 of the platform frame 7. In this position, the staircase 2 is preferably stowed behind the front panel 20 (see also FIG. 12).

Figure 2:
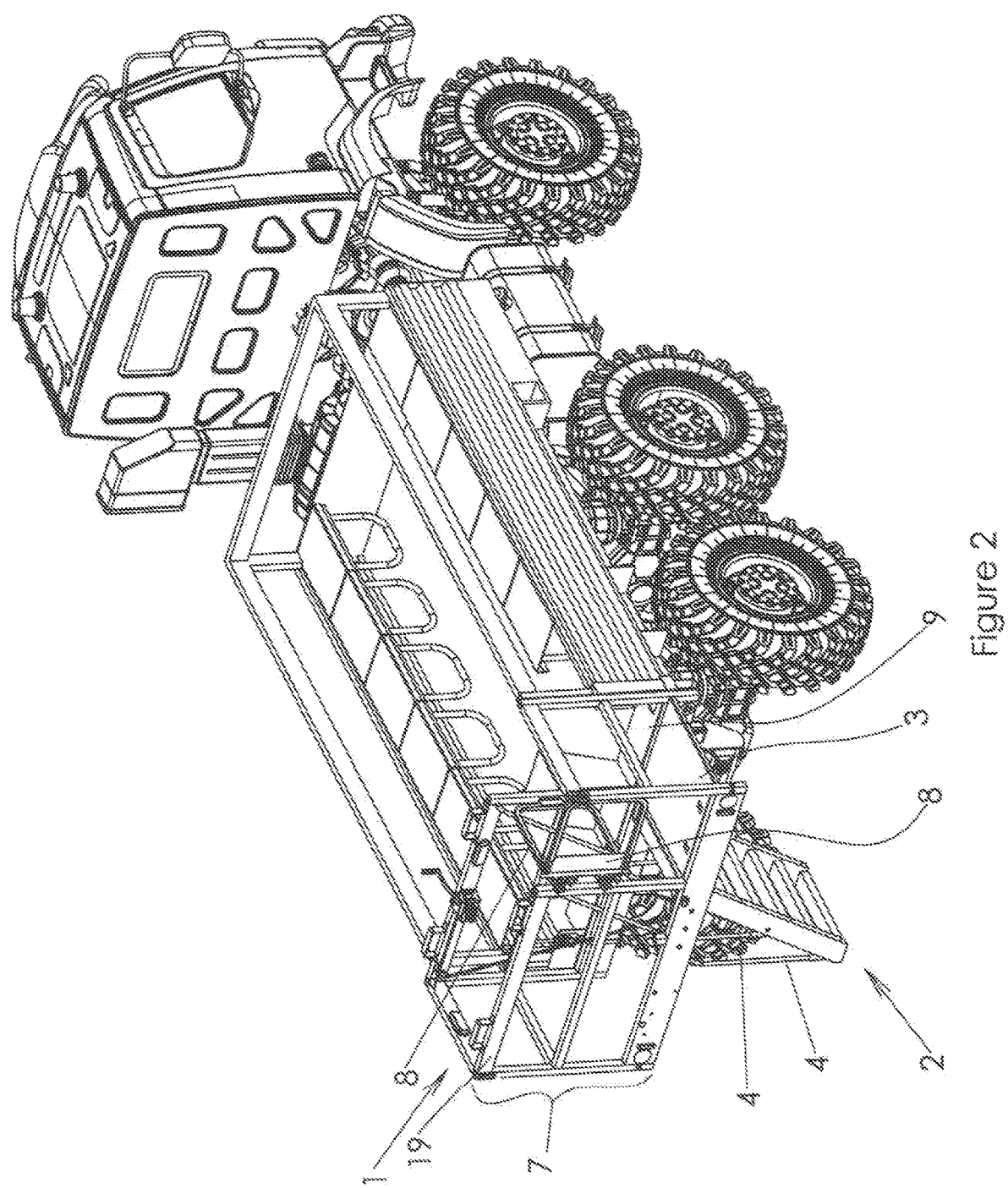
FIG. 2 is a first perspective view of the present invention shown installed on an FMTV truck with the staircase in a fully extended position.

FIG. 2 is a first perspective view of the present invention shown installed on an FMTV truck. As shown in this figure, the platform 1 comprises a platform frame 7, platform floor 3, and two pivotable gates 8. The pivotable gates 8 are preferably standard OSHA safety gates. The details of the platform frame 7 are discussed more fully in connection with FIG. 5 below. The platform floor 3 is situated at the base of the platform frame 7 and extends from the right-hand side of the platform to the top of the retractable staircase, which is preferably situated approximately one-third of the distance from the right-hand side of the platform to the left-hand side of the platform. The platform floor 3 also extends from the front of the platform frame 7 to the rear of the platform frame. An extension plate 9 extends forwardly from the rear edge of the platform at floor level toward the truck bed. The extension plate 9 is configured so that it overlies the rear edge of the truck bed when the tailgate is removed.

Figure 3:
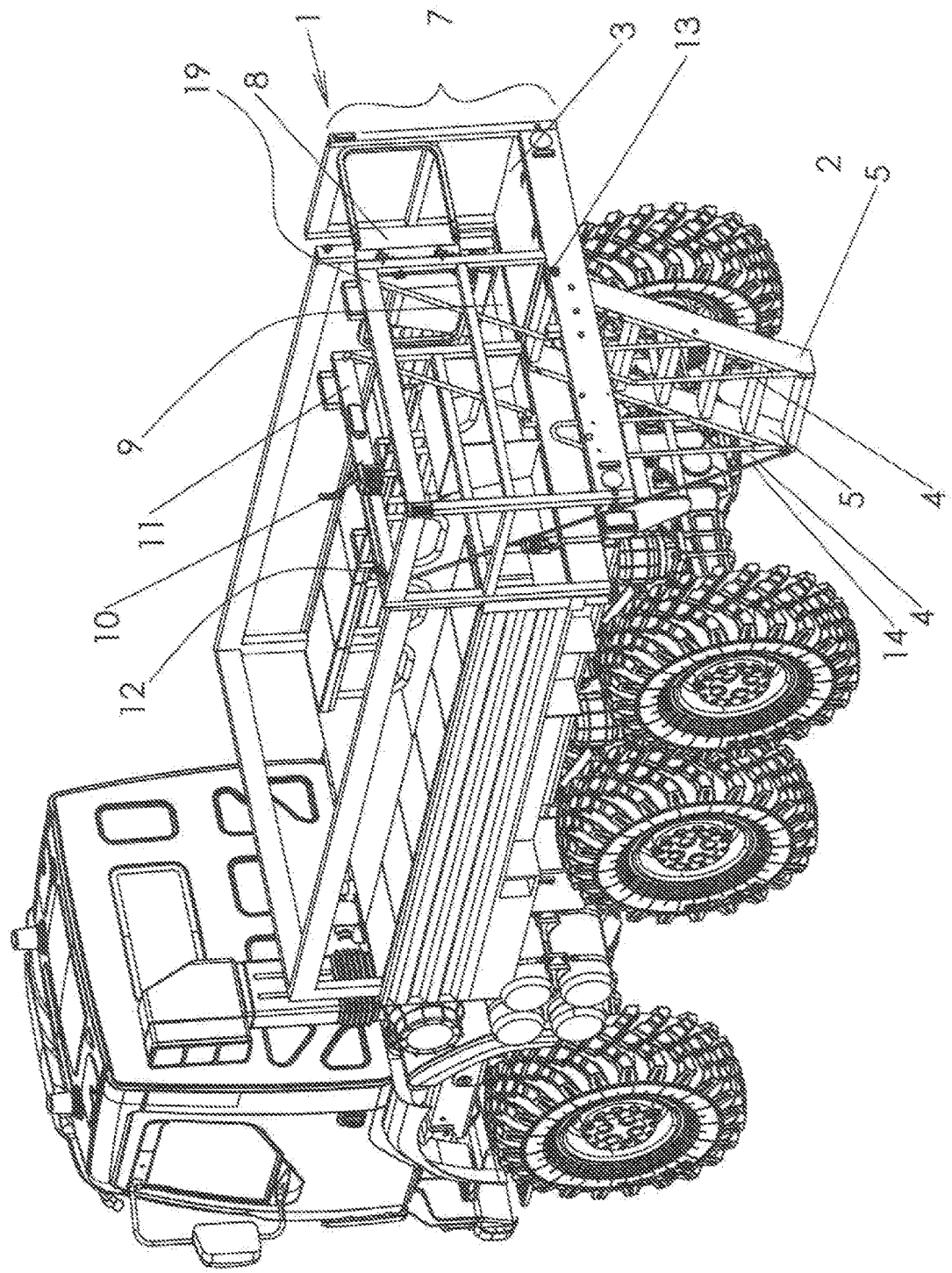
FIG. 3 is a second perspective view of the present invention shown installed on an FMTV truck with the staircase in a fully extended position.

FIG. 3 is a second perspective view of the present invention shown installed on an FMTV truck. As shown in this figure, a winch 10 is situated on the rear top rail 11 of the platform frame 7 and connected to the bottom end of the rear-most side member 5 of the staircase 2 via a pulley 12 that is situated in the top left-most corner of the platform frame. When activated, the winch 10 raises and lowers the staircase 2, which pivots at pivot point 13. Activation of the winch may be manual or electronic; as shown in these figures, the winch activation is manual. Note that the staircase 1 is connected to the platform 1 only at pivot point 13 and nowhere else. Note also that the staircase is raised when the winch 10 is rotated in a first direction, thereby pulling the staircase upward via the cable 14, and lowered by the force of gravity (that is, the weight of the staircase on the cable) when the winch 10 is rotated in the opposite direction. In a preferred embodiment, the winch 10 is a brake winch so that it holds the staircase in position even when the winch handle is released.

Figure 4:
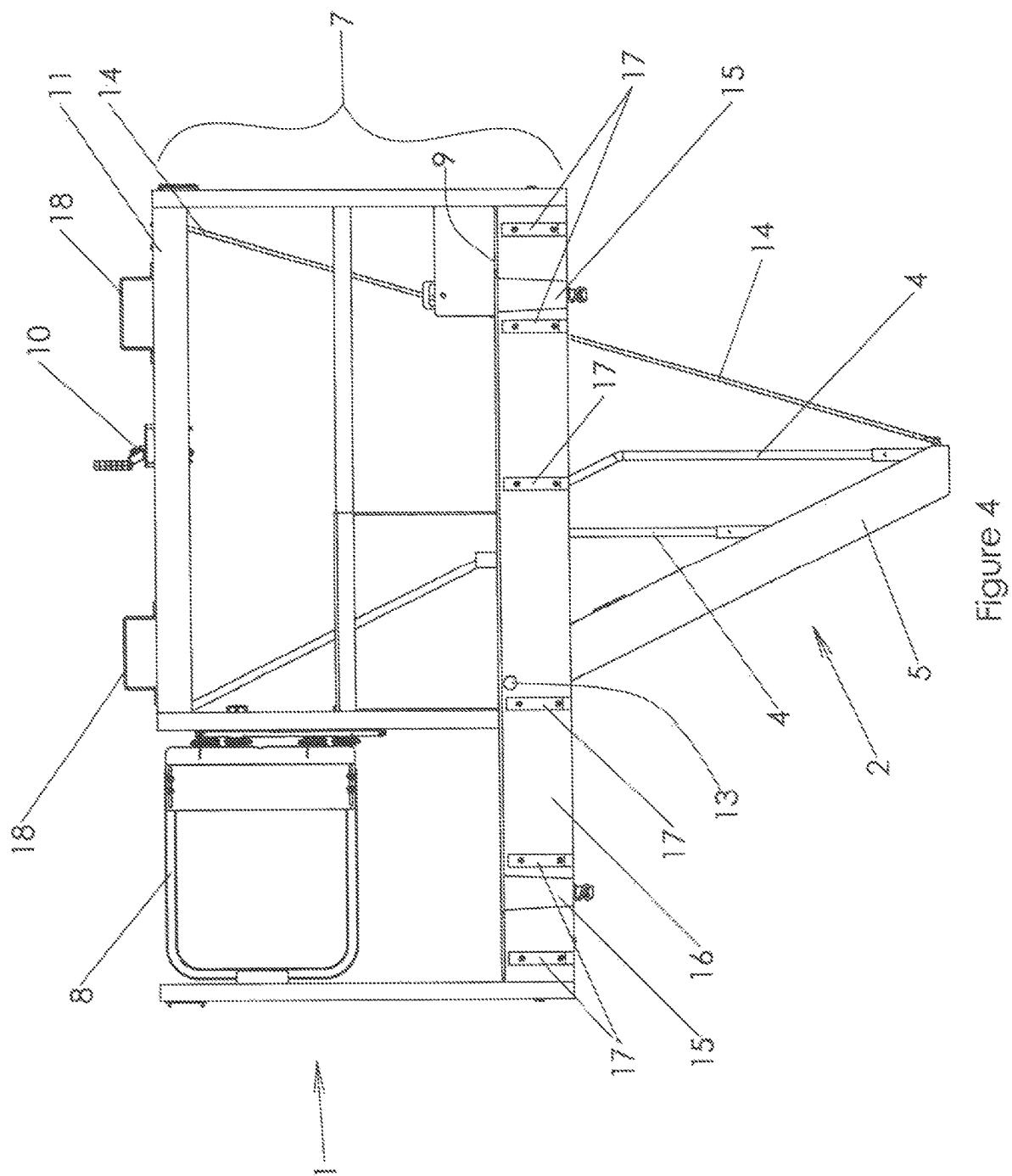
FIG. 4 is a front view of the present invention shown with the staircase in a fully extended position.

FIG. 4 is a front view of the present invention shown with the staircase in a fully extended position. As shown in this figure, two anchor legs 15 extend downwardly from the extension plate 9 forward of the platform frame 7. Each anchor leg 15 is tapered so that its width and depth at the bottom of the anchor leg are less than they are at the top of the anchor leg (that is, the bottom of the anchor leg is smaller in width and depth than the top of the anchor leg). Each anchor leg 15 is situated on the extension plate 9 so that it will fit into an existing aperture (not shown) in the truck bed. The anchor legs 15, together with the extension plate 9, which overlies a portion of the rear end of the truck bed floor, properly align and help secure the platform 1 to the truck bed. Ratchets (discussed below) also help secure the platform to the truck.

The platform frame 7 comprises a flat rear panel 16 that extends across the back edge of the platform, in a vertical orientation, beneath the level of the floor 3. A plurality of bumpers 17 is positioned on the rear surface of the rear panel 16, facing toward the truck. The bumpers 17 are configured so that they will abut up against the back surface of the truck (beneath the level of the truck bed) when the platform 1 is installed on the vehicle. Each bumper 17 is elongated in a vertical direction and extends from the bottom of the rear panel 16 to the top of the rear panel. Each bumper 17 is tapered on its bottom end (see FIG. 11) to facilitate the positioning of the platform on the truck. The bumpers are preferably made of high-density polyethylene to prevent scratching of any paint or chemical agent-resistant coating (CARC). The platform 1 preferably comprises two pairs of forklift tine pockets 18, the first pair being situated on the front top rail 19 and the second pair being situated on the rear top rail 11 of the platform frame 7 (see also FIG. 2).

Figure 5:
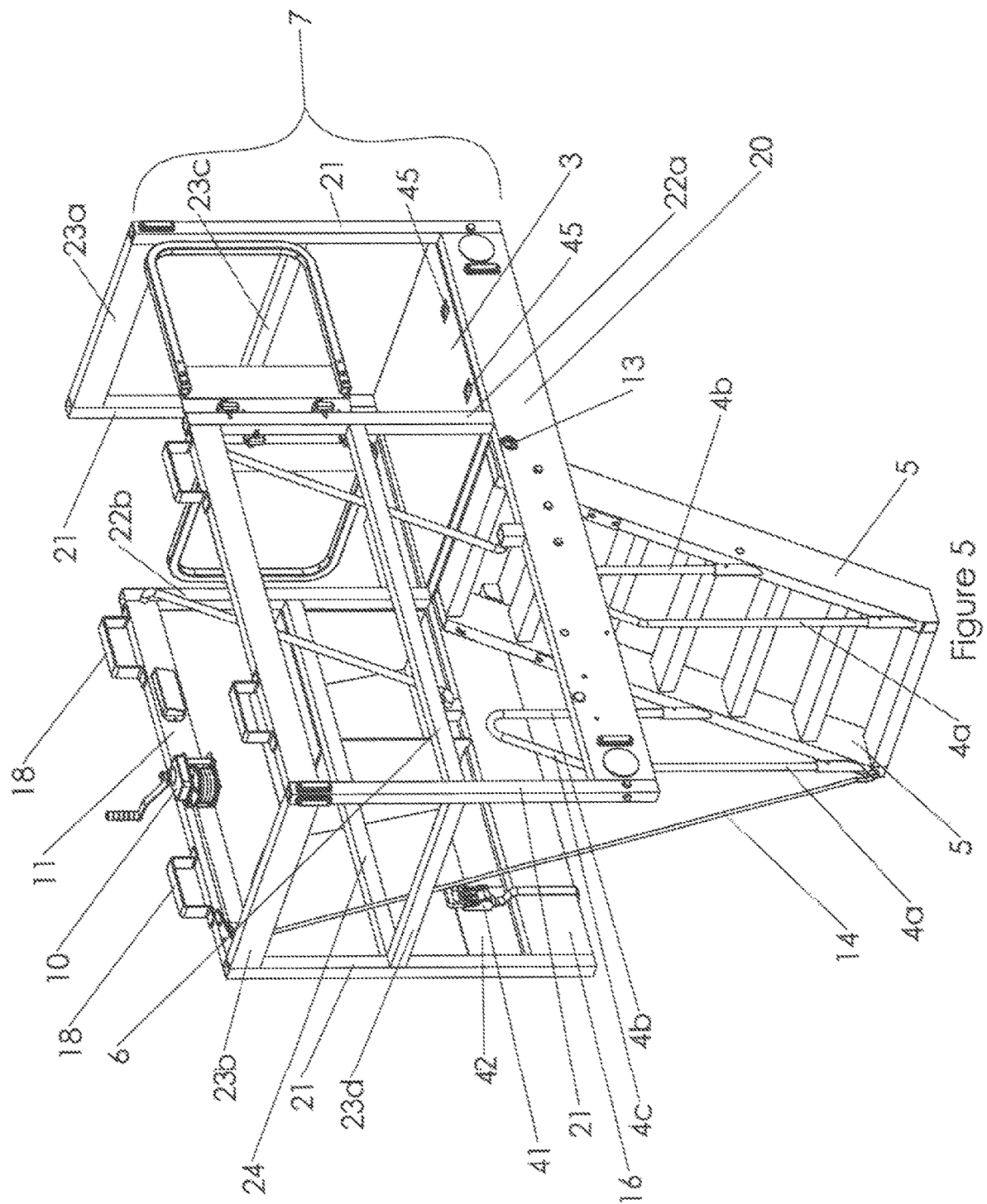
FIG. 5 is a first top perspective view of the present invention shown with the staircase in a fully extended position.

FIG. 5 is a first top perspective view of the present invention shown with the staircase in a fully extended position. As shown in this figure, the platform frame 7 is comprised of a rear panel 16 (described above) and a front panel 20. The front panel 20 extends across the front edge of the platform, in a vertical orientation, beneath the level of the floor 3. The platform frame 7 is further comprised of four corner posts 21, which are positioned in vertical orientation in the four corners of the rectangular platform frame. The platform frame 7 further comprises two upright members 22a. 22b, which are shorter than the corner posts 21 when cut but at an equal height (top level) as the corner posts when installed (see FIG. 7). The corner posts 21 are longer than the upright members 22a, 22b because they extend to the bottom of the front and rear panels 16, 20, whereas the upright members extend only to the top of the front and rear panels.

Each upright member 22a. 22b is positioned in between two of the corner posts 21 (the two front corner posts in the case of upright member 22a and the two rear corner posts in the case of upright member 22b). The front upright member 22a extends upwardly from a top edge of the front panel 20 to the top edge of the front top rail 19. The rear upright member 22b extends upwardly from a top edge of the rear panel 16 to the top edge of the rear top rail 11. Note that the front top rail 19 and the rear top rail 11 each extends from the top of a corner post 21 to a point on the platform that is equal to the entire width of the platform minus the width of the pivotable gate 8 that is situated on the front side of the platform. Thus, there is a gap ("first gap") in the platform frame 7 from the front right corner post 21 to the front upright member 22a and a similar gap ("second gap") in the platform frame 7 from the rear right corner post 21 to the rear upright member 22b. A first pivotable gate 8 is situated in the first gap and configured to swing inwardly into the interior of the platform. The second gap is preferably left wide open with no gate. A second pivotable gate 8 is situated in between the two upright members 22a. 22b and is also configured to swing inwardly into the interior of the platform.

Referring to FIG. 5, each of the corner posts 21 preferably extends from the top of the platform 1 to the bottom of the front or rear panel 20, 16, depending on where the corner post is situated (front or back of the platform). In this particular configuration, the front panel 20 extends between the bottom ends of the two corner posts 21 located at the front of the platform, and the rear panel 16 extends between the bottom ends of the two corner posts 21 located at the back of the platform. A first connecting rail 23a extends between the top ends of the two corner posts 21 on the right-hand side of the platform, and a second connecting rail 23b extends between the top ends of the two corner posts 21 on the left-hand side of the platform. A third connecting rail 23c extends between the two corner posts 21 on the right-hand side of the platform at a mid-level of the frame, and a fourth connecting rail 23d extends between the two corner posts 21 on the left-hand side of the platform at a mid-level of the frame. The front and rear midrails 6, 24 are coplanar (that is, on the same horizontal plane) as the third and fourth connecting rails 23c, 23d. The front midrail 6 extends from the front upright member 22a to the front, left corner post 21 at a mid-level of the frame, and the rear midrail 24 extends from the rear upright member 22b to the rear, left corner post 21 at a mid-level of the frame.

Figure 6:
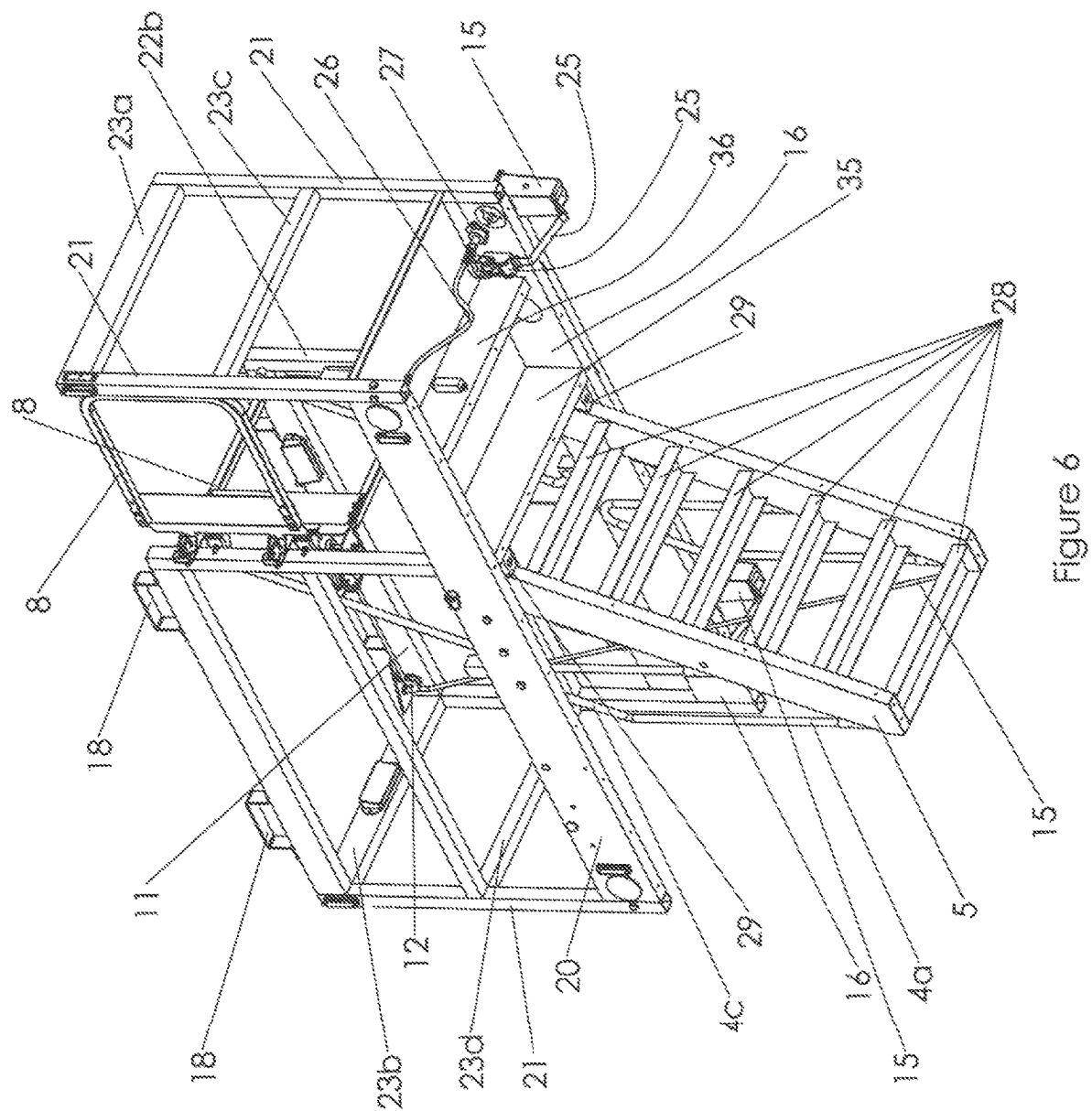
FIG. 6 is a first bottom perspective view of the present invention shown with the staircase in a fully extended position.

FIG. 6 is a first bottom perspective view of the present invention shown with the staircase in a fully extended position. As shown in this figure, the invention comprises a first surface-mount ratchet 25, which is situated on the inner surface of the rear panel 16.

Figure 13:
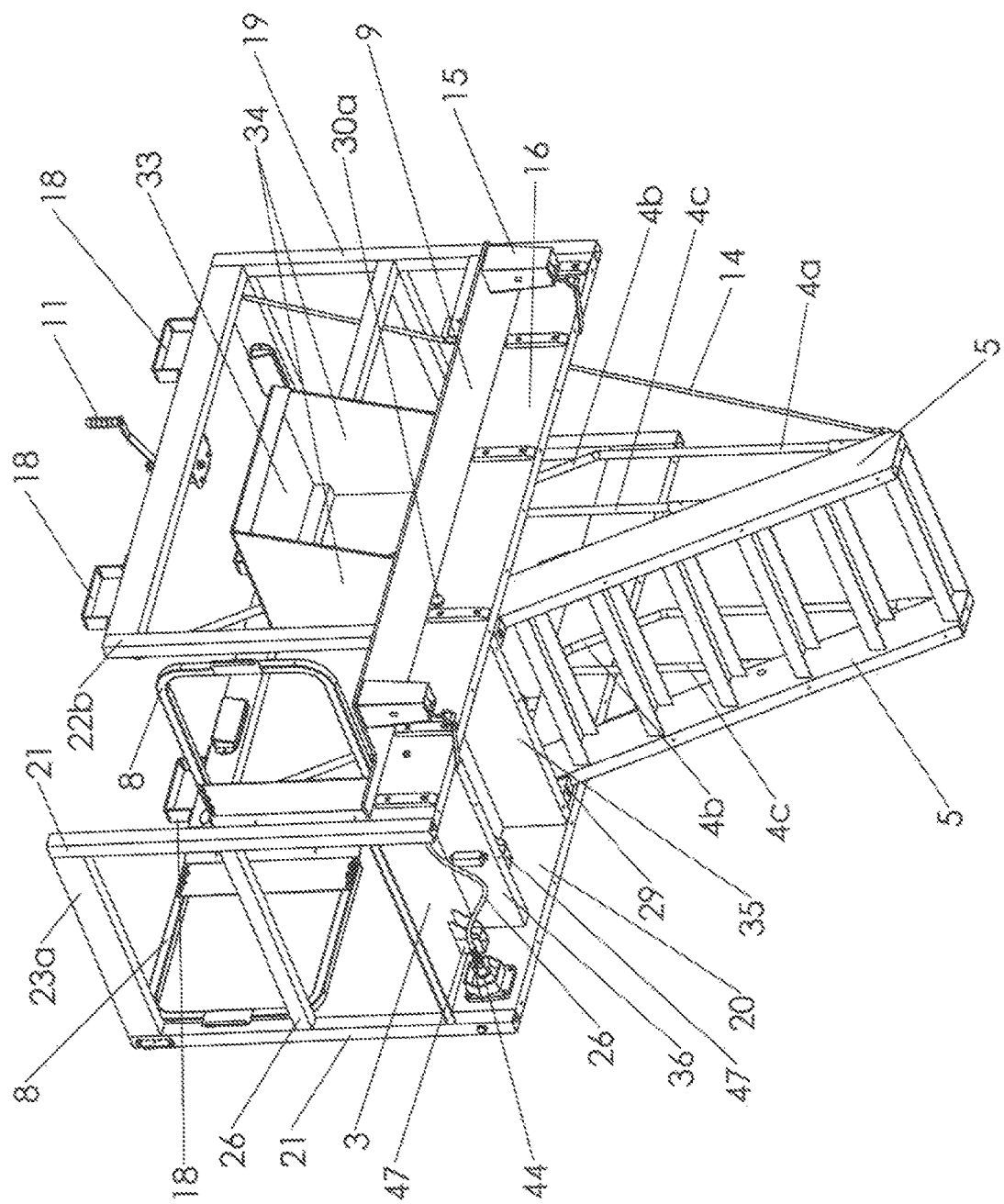
FIG. 13 is a second bottom perspective view of the present invention shown with the staircase in a fully extended position.

The first surface-mount ratchet 25 is discussed more fully below in connection with FIG. 10. This figure also shows the power cable 26, which is situated underneath the platform floor 3. The power cable 26 supplies electrical power to various lights on the platform and is configured to be plugged into the existing trailer plug (not shown) on the truck. In this figure, the power cable 26 is plugged into a port 27 on the inner surface of the rear panel 16 proximate to the first surface-mount ratchet 25. This port 27 secures the power cable 26 during transport or storage (i.e., when it is not plugged into the truck's trailer plug). As shown in FIG. 13, the power cable 26 plugs into an electrical junction box that is situated on the inside of the front panel 20.

As shown in FIG. 6, the portable staircase 2 comprise a plurality of stair steps 28 extending between the side member 5 of the staircase. Two staircase stops 29 are configured to hold the staircase at the appropriate angle when it is fully extended. The staircase stops 29 are shown in detail in FIG. 9.

FIG. 7 is a rear view of the present invention shown with the staircase in a fully retracted position. As noted above, the staircase 2 pivots about a shaft 30 at pivot point 13. This shaft 30 extends across the top part of the staircase 2 (see FIG. 9) and is secured with a pin 31 on the rear side of the platform. On the front side of the platform, the shaft 30 terminates in a head 30a (see FIG. 13), which is located on the outer surface of the rear panel 16 directly underneath the extension plate 9. The head 30a is greater in diameter than the rest of the shaft 30 and configured to prevent the shaft from being pulled forward; in other words, the shaft 30 can only be removed by removing the pin 31 and then pulling the shaft out by the head 30a. When the platform is installed on the truck, access to the head 30a is obstructed, thereby preventing the shaft from being pulled out when the platform is installed on the truck. The present invention is not limited, however, to any particular method of pivoting the staircase about the pivot point 13. The platform comprises two stationary handrails 32, each situated on an opposite side of the platform and at an angle to facilitate personnel moving from the staircase 2 to the floor 3 or vice versa.

Figure 8:
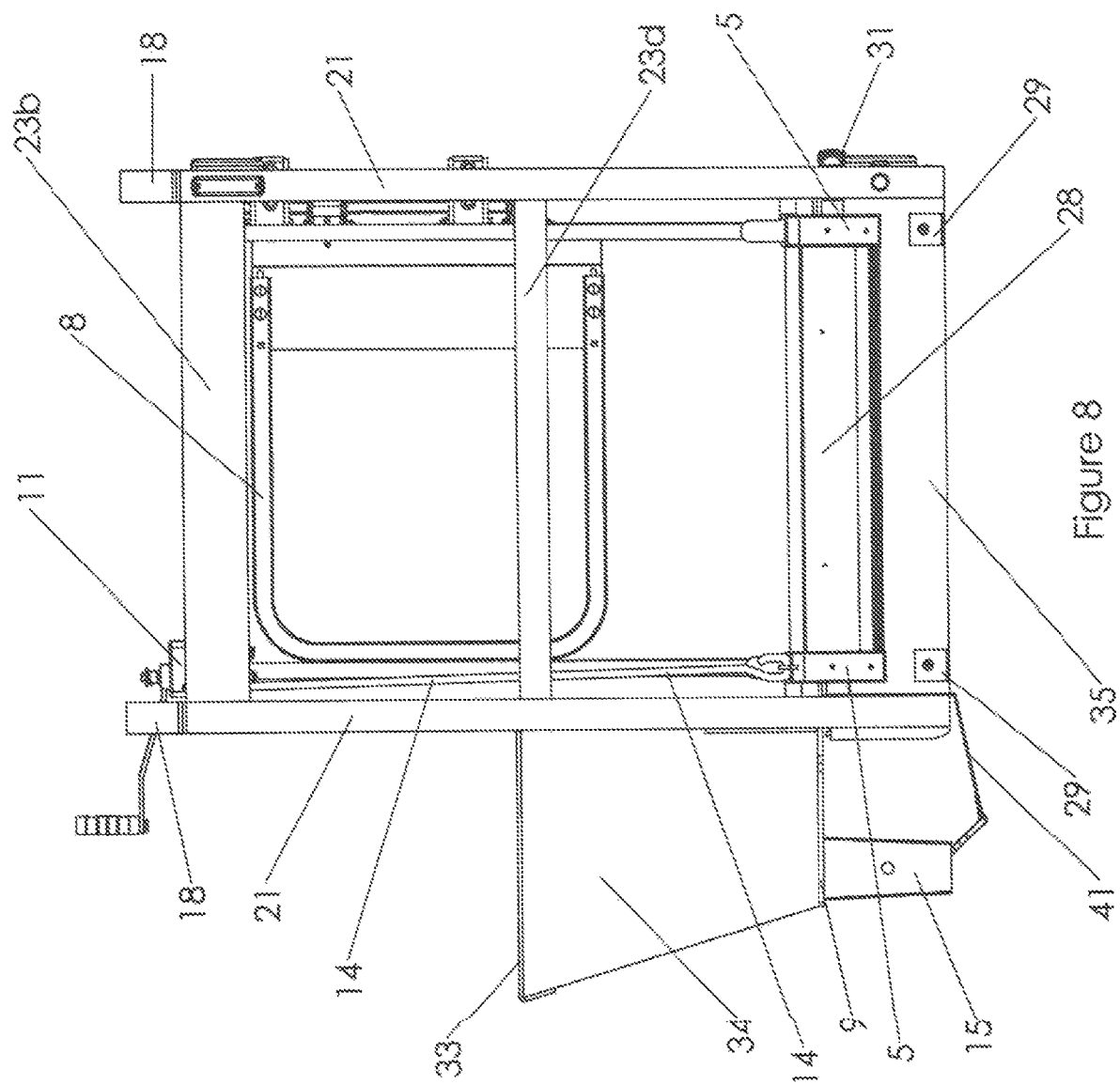
FIG. 8 is a left side view of the present invention shown with the staircase in a fully retracted position.

FIG. 8 is a left side view of the present invention shown with the staircase in a fully retracted position. As shown in this figure, the present invention comprises a seat 33 that is situated above the extension plate 9 and extends rearwardly from the rear midrail 24 toward the truck bed. The seat 33 is supported by two side plates 34, each of which is connected at its bottom end to the extension plate 9. In a preferred embodiment, the seat 33 extends further forward (into the truck bed) than the extension plate 9 (see also FIGS. 13 and 14). In addition to providing additional seating, the seat 33 provides structural support to the extension plate 9 and prevents it from bending or warping over time.

Figure 9:
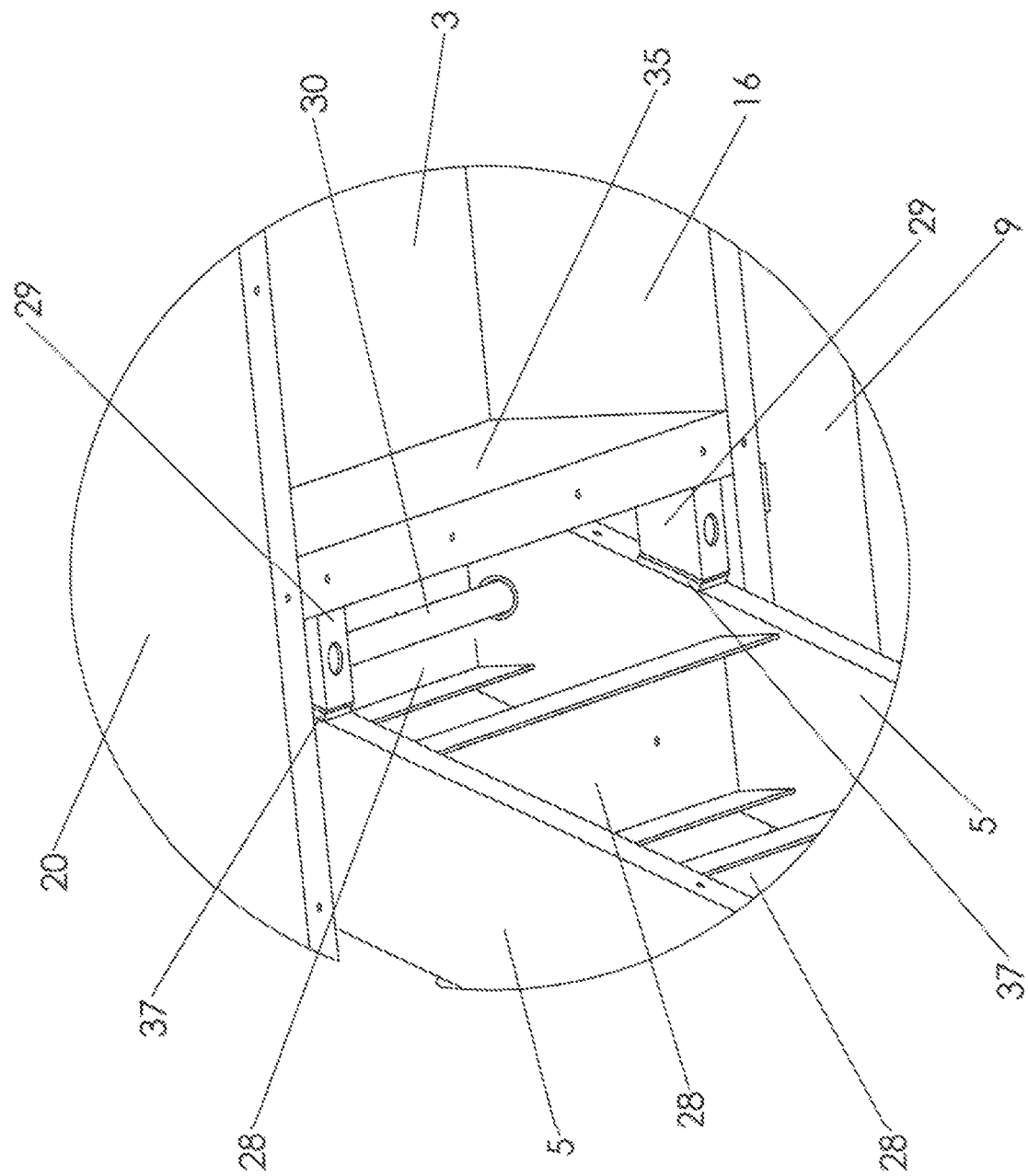
FIG. 9 is a detail view of the staircase stops.

FIG. 9 is a detail view of the staircase stops. This figure shows the shaft 30 at the top of the staircase 2. A first support member 35 is connected to and extends between the front and rear panels 20, 16 and is situated directly underneath the front and rear upright members 22a, 22b. A second support member 36 is connected to and extends between the front and rear panels 20, 16 and is situated underneath the platform floor 3. The proximal end of each of the two staircase stops 29 is fixedly attached to the first support member 35, and the distal end of each of the two staircase stops 29 is configured to abut up against the top part of the side member 5 of the staircase 2 when the staircase is fully extended. The distal end of each support member is angled at an angle that is equal to the desired angle of the staircase 2 when it is fully extended. Preferably, the distal end of each staircase stop 29 comprises a high-density polyethylene pad 37.

Figure 10:
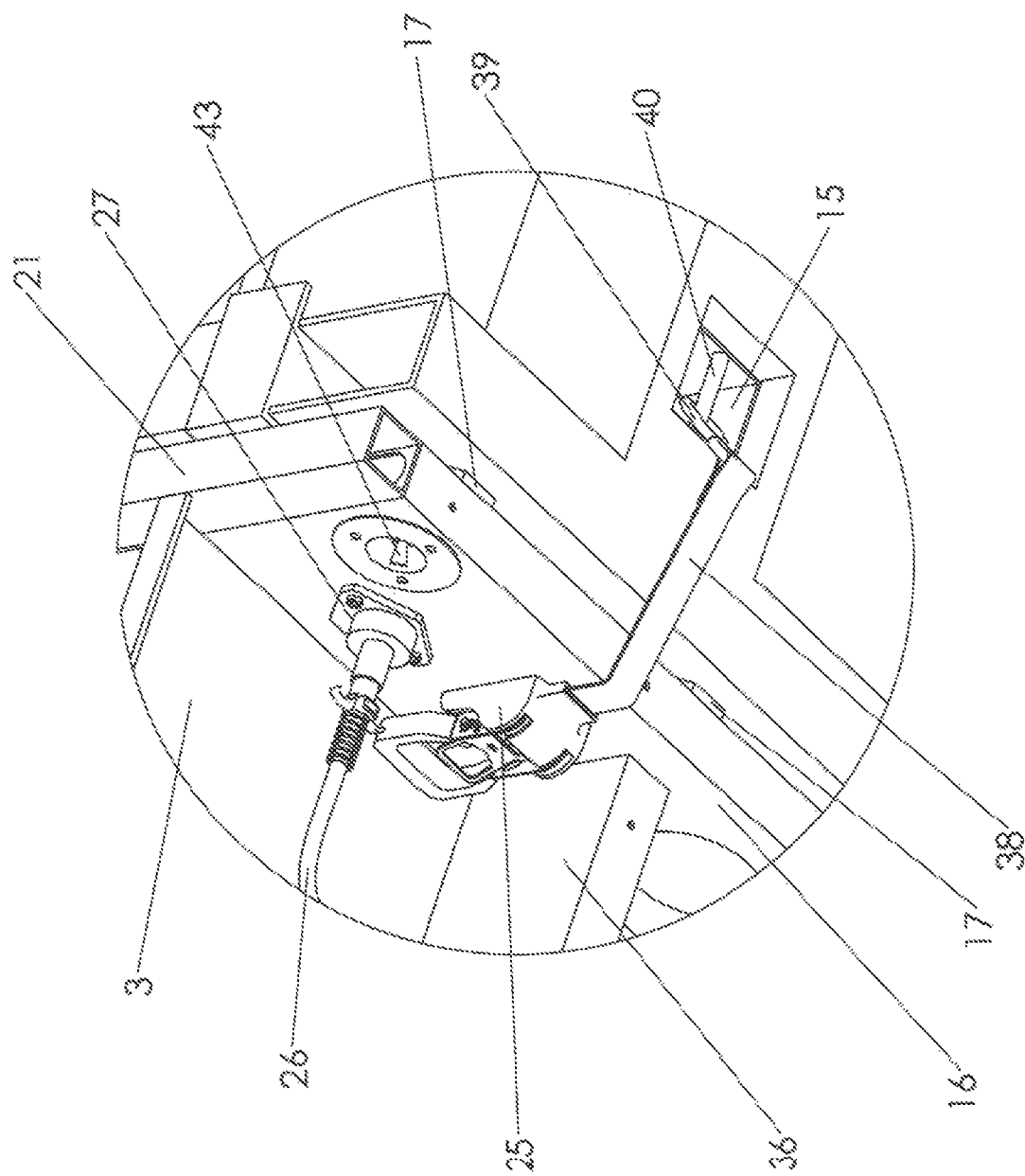
FIG. 10 is a detail view of the first surface-mount ratchet.

FIG. 10 is a detail view of the first surface-mount ratchet. As noted above, this surface-mount ratchet 25 is situated on the inner surface of the rear panel 16, proximate to the second support member 36. The ratchet 25 comprises a strap 38 and a hook 39. Each anchor leg 15 contains a pin 40 inside the bottom end of the anchor leg. When the strap 38 is extended, the hook 39 may be secured to the pin 40, as shown.

Figure 11:
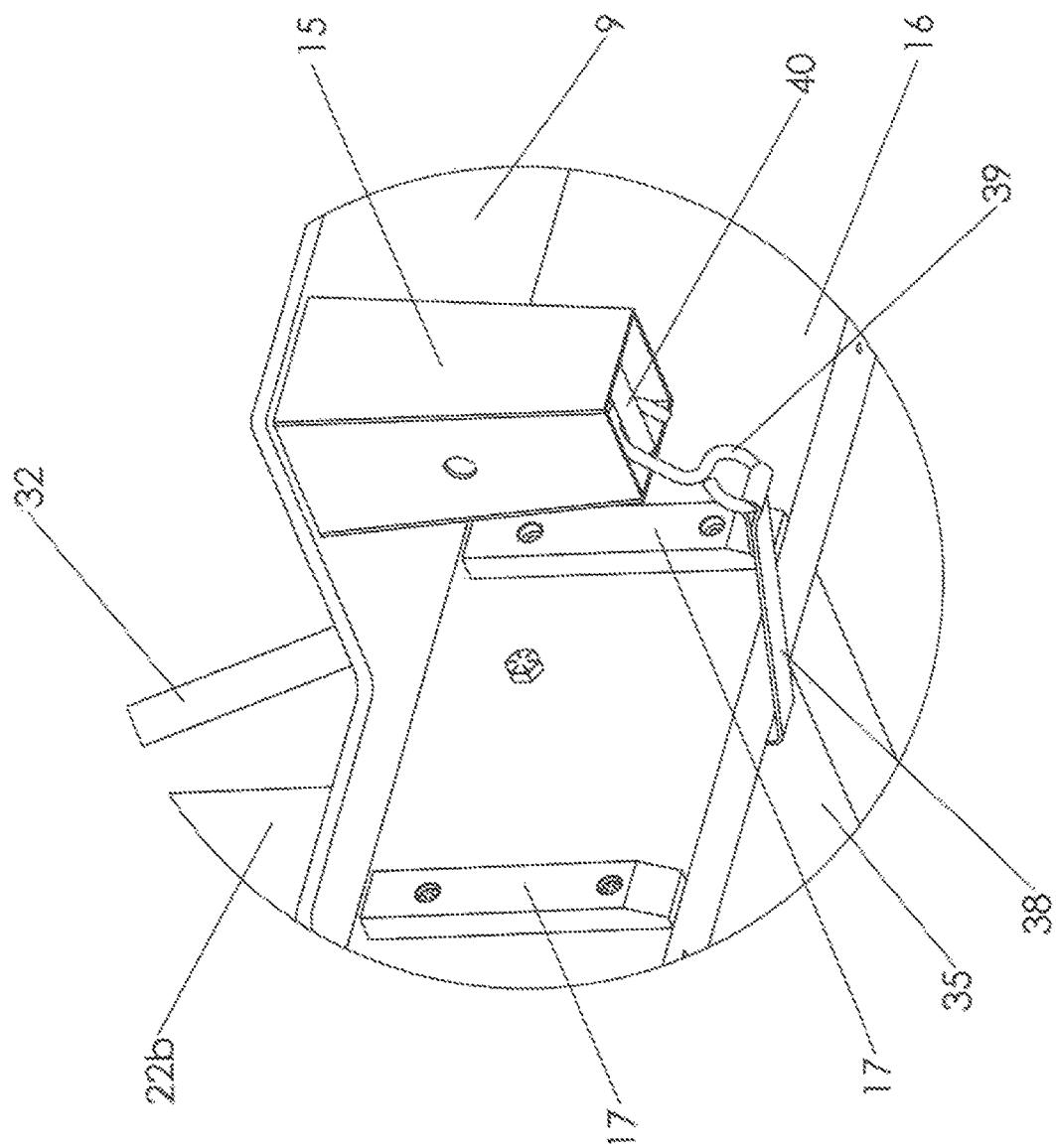
FIG. 11 is a detail view of the anchor leg, bumpers, and second surface-mount ratchet connection point.

FIG. 11 is a detail view of the anchor leg, bumpers, and second surface-mount ratchet connection point. In this particular embodiment, the second surface-mount ratchet 41 is situated on a bracket 42 directly above the rear panel 16 on the left-hand side of the platform (see FIG. 5). Like the first surface-mount ratchet, the second surface-mount ratchet 41 also has a strap 43 and a hook 44 that attaches to the pin 40 inside of the anchor leg 15, as shown. This figure also shows the tapered bottom ends of the bumpers 17. As shown in this figure, each anchor leg 15 preferably comprises a hole in the center of each side wall of the anchor leg (the anchor being comprised of a front wall, rear wall, two side walls, and an open bottom), such holes being configured to receive an existing pin on the truck for added security.

Figure 12:
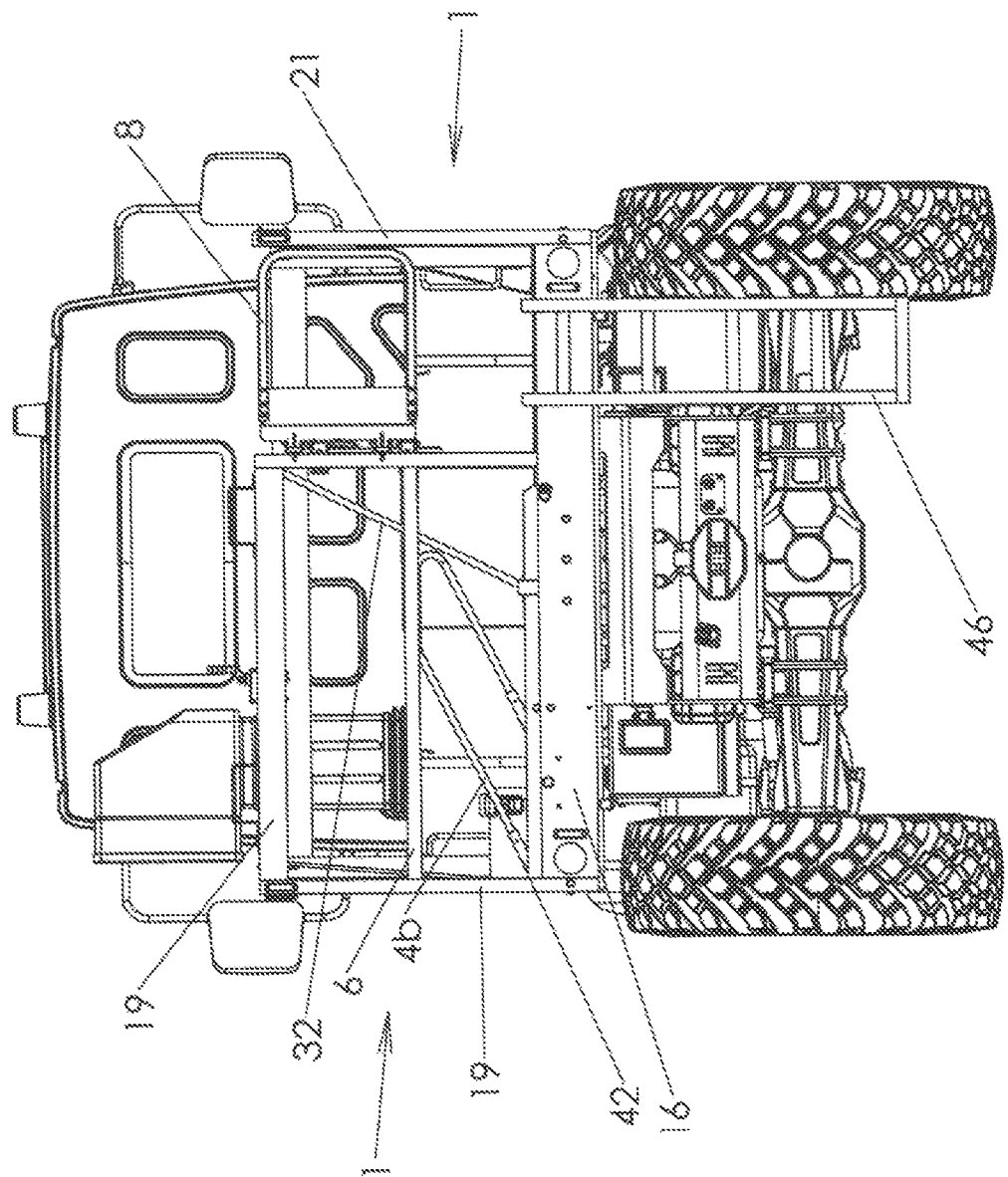
FIG. 12 is a rear view of the present invention shown with a military cargo bed ladder installed on the platform and with the staircase in a fully retracted position.

FIG. 12 is a rear view of the present invention shown with a military cargo bed ladder installed on the platform and with the staircase in a fully retracted position. As shown in FIG. 2, the floor 3 comprises two apertures 45 in the front part of the floor.

These apertures 45 are configured to receive the mounting brackets (not shown) of a military cargo bed ladder 46. The military cargo bed ladder 46 may be used for quick ingress and egress by military personnel when the portable staircase is in a retracted position.

FIG. 13 is a second bottom perspective view of the present invention shown with the staircase in a fully extended position. This figure shows the brackets 47 underneath the floor 3 that correspond to the two apertures 45 for receiving the military cargo bed ladder 46. Note that these brackets 47 are situated on either side of the second support member 36.

Figure 14:
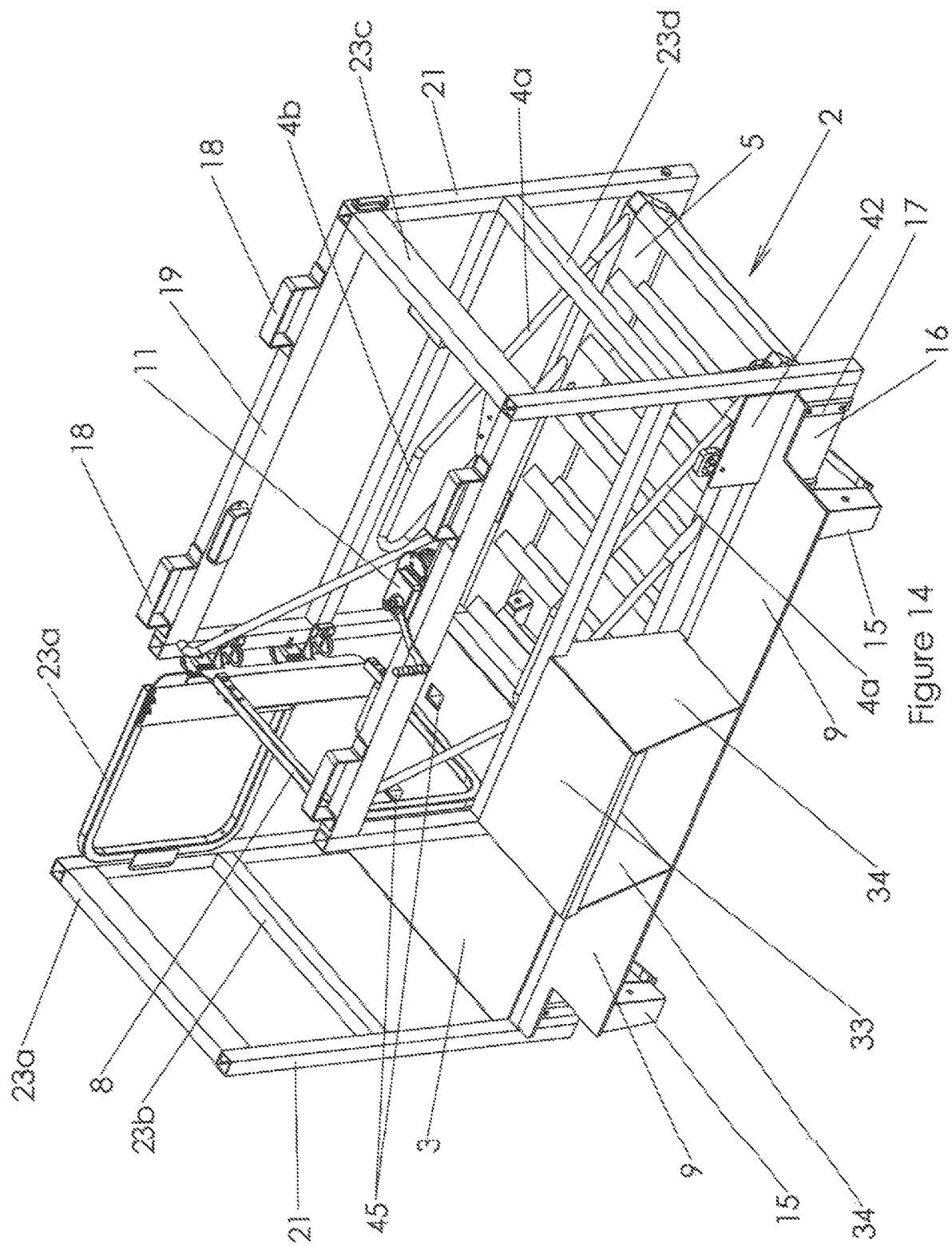
FIG. 14 is a second top perspective view of the present invention shown with the staircase in a fully retracted position.

FIG. 14 is a second top perspective view of the present invention shown with the staircase in a fully retracted position. All of the main platform parts, as well as the staircase, are preferably made of hot-dip galvanized steel.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A portable platform comprising:
   (a) a platform frame that defines a rectangular space, the platform frame comprising:
      (i) four corner posts, the first corner post being situated in a first front corner of the platform frame, the second corner post being situated in a second front corner of the platform frame, the third corner post being situated in a first rear corner of the platform frame on a same side of the platform frame as the first corner post, and the fourth corner post being situated in a second rear corner of the platform frame on a same side of the platform frame as the second corner post;
      (ii) a front panel situated along a front bottom side of the platform frame between the first and second corner posts;
      (iii) a rear panel situated along a rear bottom side of the platform frame between the third and fourth corner posts;
      (iv) a first upright member situated in between the first and second corner posts in a vertical orientation; and (v) a second upright member situated in between the third and fourth corner posts in a vertical orientation;

(b) a landing situated across a portion of a bottom of the platform frame in a space defined by the second corner post, the fourth corner post, the first upright member, and the second upright member;

(c) a retractable staircase that pivots about a pivot point that extends from the front panel to the rear panel of the platform frame, the staircase comprising two parallel side members with a plurality of stair steps disposed between them;

(d) a first pivotable gate situated on a front part of the platform frame above the landing and configured to swing inwardly;

(e) a second pivotable gate situated in between the first and second upright members above a top end of the retractable staircase and configured to swing inwardly over the landing;

(f) a first midrail that extends from the first corner post to the first upright member;

(g) a second midrail that extends from the third corner post to the second upright member and is parallel to the first midrail, thereby defining a gap between the fourth corner post and the second upright member;

(h) an extension plate that extends forwardly from a rear edge of the platform and is configured to overlie a rear edge of a truck bed; and (i) first and second anchor legs that extend downwardly from the extension plate and are configured to fit within existing apertures in the truck bed.

2. The portable platform of claim 1, wherein the extension plate is situated at a top edge of the rear panel and at a same level as the landing.

3. The portable platform of claim 2, further comprising a plurality of vertically oriented bumpers that are situated on a front surface of the rear panel and configured to abut up against a rear end of the truck when the portable platform is installed on the truck.

4. The portable platform of claim 3, wherein the bumpers are comprised of high-density polyethylene.

5. The portable platform of claim 1, wherein each anchor leg has a width and a depth at a top end of the anchor leg and a width and a depth at a bottom end of the anchor leg, and the width and the depth of the anchor leg at the bottom end of the anchor leg are less than the width and the depth of the anchor leg at the top end of the anchor leg.

6. The portable platform of claim 5, wherein the bottom end of each anchor leg comprises an internal pin that is configured to receive a hook.

7. The portable platform of claim 1, further comprising a seat that is situated on top of the extension plate and that extends forwardly from the second midrail.

8. The portable platform of claim 1, further comprising a brake winch that is configured to raise and lower the retractable staircase about the pivot point.

9. The portable platform of claim 1, wherein the retractable staircase further comprises a first handrail and a second handrail, wherein the first handrail is fixedly attached to the first side member, and wherein the second handrail is fixedly attached to the second side member.

10. The portable platform of claim 1, wherein the retractable staircase further comprises a first handrail and a second handrail, wherein the first handrail is removably attached to the first side member, and wherein the second handrail is removably attached to the second side member.

11. The portable platform of claim 6, further comprising a first surface-mount ratchet and a second surface-mount ratchet, each of the first surface-mount ratchet and the second surface-mount ratchet being configured to secure the portable platform to the truck via a hook that is secured to the pin in the anchor leg.

12. The portable platform of claim 1, further comprising a power cable that is connected to an electrical junction box on the portable platform and configured to be plugged into an existing power supply port on the truck.

13. The portable platform of claim 1, further comprising:
a first support member that is connected to and extends between the front panel and the rear panel underneath the front and rear upright members;
a second support member that is connected to and extends between the front panel and the rear panel and is situated underneath the landing; and
a first staircase stop and a second staircase stop, each of which has a proximal end that is fixedly attached to the first support member and a distal end that is configured to abut up against a top part of one of the two side members of the retractable staircase when the staircase is in a fully extended position, the distal end of each staircase stop being at an angle that is equal to a desired angle of the staircase when it is fully extended.

14. The portable platform of claim 13, wherein the distal end of each of the first and second staircase stops comprises a high-density polyethylene pad.

15. The portable platform of claim 1, wherein the landing comprises two apertures that are configured to receive mounting brackets of a military cargo bed ladder, the two apertures being situated directly underneath the first pivotable gate.

16. The portable platform of claim 1, wherein the platform frame further comprises a front top rail that extends from the first corner post to the first upright member at a top of the platform frame and a rear top rail that extends from the third corner post to the second upright member at the top of the platform frame;
wherein a pair of forklift tine pockets is situated on top of the front top rail; and
wherein a pair of forklift tine pockets is situated on top of the rear top rail.

* * * * *